United States Patent [19]
Frisk

[11] Patent Number: 5,830,545
[45] Date of Patent: Nov. 3, 1998

[54] MULTILAYER, HIGH BARRIER LAMINATE

[75] Inventor: Peter Frisk, Chicago, Ill.

[73] Assignee: Tetra Laval Holdings & Finance, S.A., Pully, Switzerland

[21] Appl. No.: 642,023

[22] Filed: Apr. 29, 1996

[51] Int. Cl.$^6$ ............................ B65D 30/08; B32B 27/08
[52] U.S. Cl. .................. 428/34.7; 428/35.2; 428/195; 428/477.7; 428/480; 428/483; 428/515; 428/516; 428/520; 428/702; 428/910; 383/113
[58] Field of Search ..................................... 428/35.2, 480, 428/516, 195, 689, 34.4, 34.5, 910, 702, 477.7, 483, 515, 520, 34.7; 383/113, 109, 105

[56] References Cited

U.S. PATENT DOCUMENTS

| | | | |
|---|---|---|---|
| 4,041,209 | 8/1977 | Scholle | 428/500 |
| 4,092,264 | 5/1978 | Tsang et al. | 282/188.28 |
| 4,102,803 | 7/1978 | Fujishima et al. | 252/186.24 |

(List continued on next page.)

OTHER PUBLICATIONS

"O$_2$ Scavenger May Replace Barrier Resins in Core Layers," Modern Plastics International, Apr. 1992, p. 20.

Sherman, Lilli Manolis, "New Barrier Technologies Enhance Packaging Films and Bottles," Plastics Technology, V41, N12, Dec. 1995, p. 17(4).

Primary Examiner—Rena L. Dye
Attorney, Agent, or Firm—Michael A. Catania

[57] ABSTRACT

A high barrier, multilayer laminate is disclosed that is suitable for forming packages that contain oxygen sensitive products. The laminate material comprises a first layer including biaxially oriented polyethylene terephthalate, a second layer of a high barrier oxide material disposed exterior to the first layer, and a third layer of an adhesive material disposed interior to the first layer and joining the first layer to a fourth coextruded multilayer material. The fourth coextruded multilayer material comprises from exterior to interior: i) a first layer of a polyethylene material, ii) an oxygen scavenging layer comprising a polyethylene and an oxygen scavenger material, wherein the oxygen scavenging layer is disposed interior to the first layer of the polyethylene material, and iii) a second layer of the polyethylene material disposed interior to the oxygen scavenging layer. A further laminate structure suitable for forming a package containing an oxygen sensitive product is also disclosed. The further laminate comprises a first layer comprising biaxially oriented polyethylene terephthalate, biaxially oriented polyamide, or biaxially oriented polypropylene, a second layer of a high barrier oxide material disposed interior to the first layer, and a third layer of an adhesive material disposed interior to the second layer and joining the second layer to a fourth layer of a polyethylene material. The third layer of adhesive material includes an oxygen scavenger material.

66 Claims, 7 Drawing Sheets

OTHER PUBLICATIONS

| | | | |
|---|---|---|---|
| 4,166,807 | 9/1979 | Komatsu et al. | 502/62 |
| 4,192,773 | 3/1980 | Yoshikawa et al. | 502/62 |
| 4,199,472 | 4/1980 | Ohtsuka et al. | 502/404 |
| 4,230,595 | 10/1980 | Yamaji et al. | 252/188.28 |
| 4,363,734 | 12/1982 | Slovinsky | 210/750 |
| 4,384,972 | 5/1983 | Nakamura et al. | 252/188.21 |
| 4,510,162 | 4/1985 | Nezat | 426/124 |
| 4,524,015 | 6/1985 | Takahashi et al. | 252/188.28 |
| 4,554,190 | 11/1985 | McHenry et al. | 220/415 |
| 4,588,443 | 5/1986 | Bache | 106/644 |
| 4,588,561 | 5/1986 | Aswell et al. | 422/238 |
| 4,702,966 | 10/1987 | Farrell et al. | 428/500 |
| 4,745,013 | 5/1988 | Kudert et al. | 428/36.7 |
| 4,762,722 | 8/1988 | Izumimoto et al. | 426/124 |
| 4,769,175 | 9/1988 | Inoue | 252/188.28 |
| 4,769,268 | 9/1988 | Burton | 428/97 |
| 4,836,952 | 6/1989 | Nasu et al. | 428/188.28 |
| 4,908,151 | 3/1990 | Inoue et al. | 252/188.28 |
| 4,992,410 | 2/1991 | Cullen et al. | 502/407 |
| 4,999,229 | 3/1991 | Moritani et al. | 428/36.6 |
| 5,021,515 | 6/1991 | Cochran | 525/371 |
| 5,034,252 | 7/1991 | Nilsson et al. | 428/35.8 |
| 5,049,624 | 9/1991 | Adams et al. | 525/371 |
| 5,064,698 | 11/1991 | Courtright et al. | 428/35.4 |
| 5,075,362 | 12/1991 | Hofeldt et al. | 524/72 |
| 5,085,878 | 2/1992 | Hatakeyama et al. | 426/107 |
| 5,102,673 | 4/1992 | Sugihara et al. | 426/124 |
| 5,108,649 | 4/1992 | Matsumoto et al. | 252/188.28 |
| 5,120,585 | 6/1992 | Sutter et al. | 428/34.2 |
| 5,126,174 | 6/1992 | Courtright et al. | 428/34.3 |
| 5,128,060 | 7/1992 | Ueno et al. | 252/184 |
| 5,143,763 | 9/1992 | Yamada et al. | 428/36.2 |
| 5,143,769 | 9/1992 | Moriya et al. | 428/76 |
| 5,153,038 | 10/1992 | Koyama et al. | 428/35.8 |
| 5,180,518 | 1/1993 | Sugihara et al. | 252/188.28 |
| 5,186,991 | 2/1993 | Samuel et al. | 428/35.8 |
| 5,194,478 | 3/1993 | Frandsen et al. | 524/398 |
| 5,202,052 | 4/1993 | Zenner et al. | 252/188.28 |
| 5,204,389 | 4/1993 | Hofeldt et al. | 524/72 |
| 5,206,075 | 4/1993 | Hodgson, Jr. | 428/216 |
| 5,207,943 | 5/1993 | Cullen et al. | 252/188.28 |
| 5,227,411 | 7/1993 | Hofeldt et al. | 523/100 |
| 5,236,617 | 8/1993 | Ueno et al. | 252/188.28 |
| 5,239,016 | 8/1993 | Cochran et al. | 525/371 |
| 5,246,753 | 9/1993 | Koyama et al. | 428/36.7 |
| 5,254,354 | 10/1993 | Stewart | 428/106 |
| 5,262,375 | 11/1993 | McKedy | 502/406 |
| 5,272,210 | 12/1993 | Galante | 525/227 |
| 5,281,360 | 1/1994 | Hong et al. | 252/188.28 |
| 5,286,407 | 2/1994 | Inoue et al. | 252/188.28 |
| 5,298,532 | 3/1994 | Ali | 522/27 |
| 5,310,497 | 5/1994 | VeSpeer et al. | 252/188.28 |
| 5,346,644 | 9/1994 | Speer et al. | 252/188.28 |
| 5,346,697 | 9/1994 | Tokuyama et al. | 494/195.1 |
| 5,350,622 | 9/1994 | Speer et al. | 428/215 |
| 5,358,792 | 10/1994 | Mehta et al. | 428/516 |
| 5,362,531 | 11/1994 | Samuel et al. | 428/36.6 |
| 5,364,555 | 11/1994 | Zenner et al. | 252/188.28 |
| 5,376,439 | 12/1994 | Hodgson et al. | 428/220 |
| 5,378,428 | 1/1995 | Inoue et al. | 422/9 |
| 5,381,914 | 1/1995 | Koyama et al. | 215/341 |
| 5,387,368 | 2/1995 | Nishimura et al. | 252/188.28 |
| 5,391,420 | 2/1995 | Bootman et al. | 428/195 |
| 5,399,289 | 3/1995 | Speer et al. | 252/188.28 |
| 5,419,936 | 5/1995 | Tindale | 428/35.8 |
| 5,425,896 | 6/1995 | Speer et al. | 252/188.28 |
| 5,435,889 | 7/1995 | Dietrich | 216/63 |
| 5,437,932 | 8/1995 | Ali et al. | 428/461 |
| 5,445,856 | 8/1995 | Chaloner-Gill | 428/35.9 |
| 5,456,959 | 10/1995 | Dawes | 428/34.1 | ved.
MULTILAYER, HIGH BARRIER LAMINATE

TECHNICAL FIELD

The present invention relates to a multilayer, high barrier laminate material. More specifically, the present invention relates to a multilayer, high barrier laminate material that includes an oxygen scavenging layer, wherein the laminate is particularly suitable for packaging oxygen sensitive products.

BACKGROUND

Various packaged products are susceptible to degradation due to reactions with oxygen. The packaged products generally come into contact with the oxygen in two primary manners. First, the packaged product may not completely fill the container in which it is disposed thereby leaving a headspace. This headspace typically includes oxygen that may react with the packaged product resulting in the above-noted degradation. Second, the packaged product may come into contact with oxygen that diffuses through the walls of the package from the ambient atmosphere.

A number of approaches to inhibit exposure of the packaged product to oxygen are known. One such approach includes the provision of an oxygen scavenging sachet in the container. The sachet contains an oxygen scavenging material such as iron, iron oxide, or hydroxide. The oxygen scavenging material reacts with oxygen in the headspace of the container as well as with oxygen that diffuses through the walls of the container.

Another approach relates to modifying the atmosphere within the container to effectively eliminate as much oxygen as possible from the container during the packaging process. This approach, however, neglects the fact that oxygen may permeate through the container walls after the packaging process is complete.

Still another approach relates to the inclusion of an oxygen scavenging material in the walls of the package. Several patents relating to this approach include U.S. Pat. Nos. 5,021,515; 5,049,624; and 5,350,622. The structures disclosed in these patents are often difficult to manufacture.

SUMMARY OF THE INVENTION

A high barrier, multilayer laminate is disclosed that is suitable for forming packages that contain oxygen sensitive products. The laminate material comprises a first multilayer structure including a layer of biaxially oriented polyethylene terephthalate, and a layer of a high barrier oxide material that is preferably disposed adjacent to the BOPET layer. A layer of an adhesive material is disposed interior to the first multilayer structure and joins the first multilayer structure to a second, coextruded multilayer structure. The second coextruded multilayer structure comprises from exterior to interior: i) a first layer of a polyethylene material, ii) an oxygen scavenging layer comprising a polyethylene and an oxygen scavenger material, wherein the oxygen scavenging layer is disposed interior to the first layer of the polyethylene material, and iii) a second layer of the polyethylene material disposed interior to the oxygen scavenging layer. Advantageously, the high barrier oxide material is transparent like the BOPET layer. Thus, the high barrier oxide layer or BOPET layer can carry a printed decoration on its surface. Such a printed decoration can be applied by a reverse printing mode laminated to the high barrier oxide.

A further laminate structure suitable for forming a package containing an oxygen sensitive product is also disclosed.

The further laminate comprises a first multilayer structure comprising a layer of biaxially oriented polyethylene terephthalate, polyamide, biaxially oriented polyamide, or biaxially oriented polypropylene, and a layer of a high barrier oxide material that is preferably adjacent the BOPET, BOPA, or BOPP layer. A layer of an adhesive material is disposed interior to the first layer and joining the first layer to a fourth layer of a polyethylene material. The third layer of adhesive material includes an oxygen scavenger material. This further structure may also include a printed decorative layer on the layer of high barrier oxide.

Other objects and advantages of the present invention will become apparent upon reference to the accompanying detailed description when taken in conjunction with the following drawings.

DETAILED DESCRIPTION OF THE PREFERRED EMBODIMENT

Figure 1:
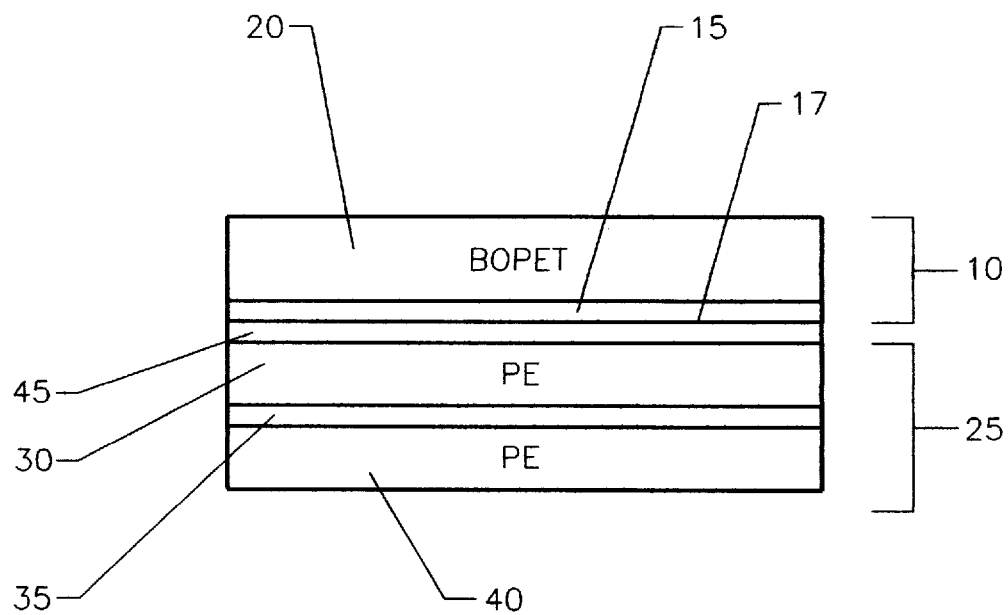
FIG. 1 is a cross-sectional view of one embodiment of a laminate suitable for use in forming a package that contains an oxygen sensitive product.

FIG. 1 illustrates one embodiment of the present laminate. As illustrated, the laminate includes a first multilayer structure 10 of a high barrier oxide layer 15 that is disposed interior to an exterior layer of biaxially oriented polyethylene terephthalate (PET) 20, that, for example, may have a thickness of about ½ mils or 12 microns. The high barrier oxide layer 15 may have, for example, a thickness of several angstroms, depending on such desired attributes as the material stiffness and barrier properties. Alternatively, the high barrier oxide layer may be disposed exterior to the layer of biaxially oriented polyethylene terephthalate, as will be discussed below in connection with other embodiments. Given the light transmitting properties of the layers 15 and 20, the high barrier oxide layer 15 may carry a printed decoration, for example, on surface 17. Alternatively, the printed layer may be disposed on the surface of the layer of biaxially oriented polyethylene terephthalate adjacent the high barrier oxide layer 15.

A second multilayer structure 25 includes an exteriorly disposed polyethylene layer 30, an oxygen scavenging layer 35 disposed interior to the polyethylene layer 30, and a further polyethylene layer 40 disposed interior to the oxygen scavenging layer 35 that, for example, forms the product contact layer. By way of example, the second multilayer structure 25 may have a total thickness of between 50 microns and 100 microns. The first and second multilayer structures 10 and 25 are joined together in a wet or dry lamination process by an adhesive layer 45.

The high barrier oxide layer 15 may be a layer of silicon oxide (SiOx), aluminum oxide (AlOx), or titanium oxide (TiOx). Layer 15 may be deposited, for example, using a plasma-enhanced chemical vapor deposition process or, alternatively, using a liquid phase or gaseous phase photochemical vapor deposition process. The layer 15 is, preferably, less than 500 Å, and, even more preferably, between 50 Å and 100 Å.

Figure 2:
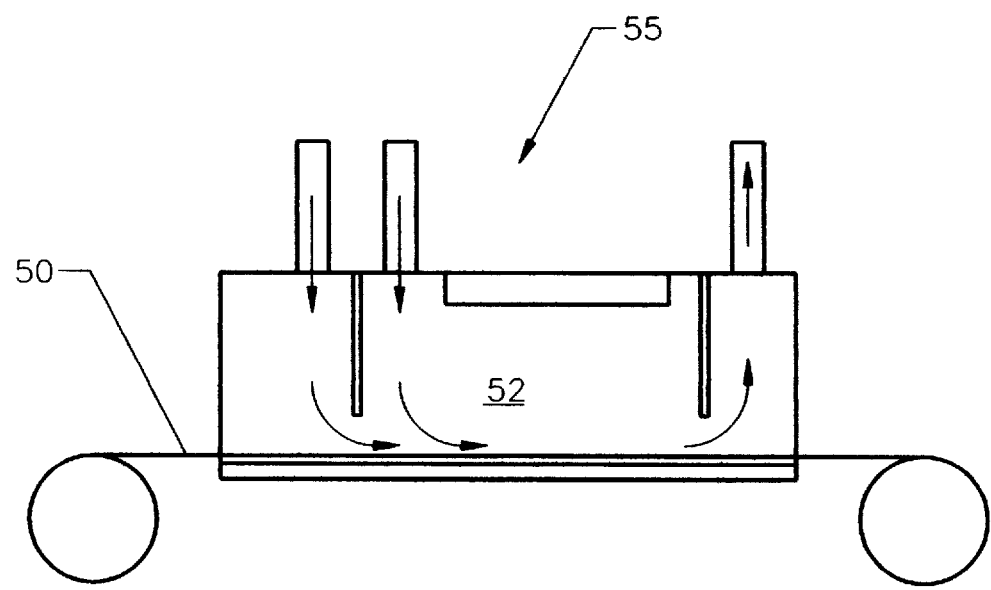
FIG. 2 is a diagram illustrating one embodiment of a system that may be used to apply the high barrier oxide of the laminate of FIG. 1.

An economical apparatus and method for depositing a barrier layer on a substrate material is set forth in U.S. Ser. No. 08/527,414, filed Sep. 13, 1995, which is hereby incorporated by reference. FIG. 2 illustrates one embodiment of the apparatus of that application.

In accordance with the method and apparatus as applied to the present laminate structure, a continuous web of substrate material 50 is provided on which the barrier layer is to be deposited. The web may comprise the BOPET layer 20 alone or in laminated combination with the second multilayer structure 25. The web of substrate material is driven, either continuously or in an indexed fashion, through a reaction chamber 52 of a deposition apparatus 55 wherein there is provided a flow of precursor gas and oxidizer gas. The reaction chamber has an internal pressure of about one atmosphere. The continuous web of substrate material, the precursor gas, and the oxidizer gas are exposed to ultraviolet radiation in the reaction chamber as the continuous web of substrate material is driven therethrough to thereby provide the high barrier oxide layer on the web of substrate material. The method allows a continuous web of substrate material to be continuously processed at a reaction pressure of about one atmosphere thereby making the production of the resulting packaging material more economical than the batch processing at low pressure that is required of the prior processes.

If a barrier layer of SiOx material is desired to be deposited on the web of substrate material, the precursor may be an organic silane such as tetraethoxysilane (TEOS), triethoxysilane, tetraacetoxysilane, or a siloxane such as hexamethyldisiloxane (HMDSO). Other silicon precursors may also be utilized, although organic silanes and organic siloxanes are preferable since they tend to be safer for use in large scale processing. The oxidizing gas may, for example, be an oxidizer such as $N_2O$ or $O_2$. The carrier gas may be an inert gas such as $N_2$, Ar, or He. An aluminum based precursor is chosen if an aluminum oxide barrier is desired.

Various polyethylene materials may be used as the polyethylene material of the second multilayer structure 25. The particular polyethylene chosen is dependent, among other things, on the particular contents that will be enclosed by the packaging material. For example, low density polyethylene is particularly well suited for use as the polyethylene of the second multilayer structure 25 where the packaged contents is a dry product, while linear low density polyethylene is particularly suitable for packaging liquid material. Other suitable polyethylenes include very low density polyethylene, high density polyethylene, ultra low density polyethylene, and metallocenes.

The oxygen scavenger layer 35 comprises, preferably, the same polyethylene material as layers 30 and 40 and is compounded with an oxygen scavenging material in an amount between 0.1% and 99.9% of the total weight of the oxygen scavenger layer 35. The oxygen scavenging material may be selected from one or more materials including: an iron-based material; an organic compound; and/or a biologically active compound. Examples of iron based compounds include FeOx, pure iron, and $Fe_xO_z(OH)_T$. Such iron-based materials allow the oxygen scavenging layer 35 of the disclosed laminate to be humidity activated at a time prior to or concurrent with the filling of a package formed from the laminate. For example, the laminate may be placed in an elevated temperature and humidity environment prior to or concurrent with the filling process for a predetermined time period sufficient to activate the iron-based material. Prior to such time, the laminate may be stored indefinitely in a place of relatively low humidity. A further, iron-based oxygen scavenger material suitable for use in the present laminate is a material known as OXYGUARD which is available from Toyo Seikan Kaisha of Yokohama, Japan.

Various organic materials and compounds are also suitable for use in the oxygen scavenging layer 35, both singly and in combination. For example, ground sea grass and/or ground tea leaves may be suitable for use in the layer 35. A rice extract, such as disclosed in U.S. Pat. No. 5,346,697, may also be utilized.

Monomers and short-chain polymers of, for example, polypropylene and/or polyethylene are likewise suitable. If a short chain polymer is used, selective activation of the oxygen scavenging layer 35 becomes possible by irradiating the laminate with, for example, ultraviolet light or with electron beam emissions. Such irradiation effects a cutting of the inter-monomer bonds thereby creating even shorter, and more chemically active, polymer chains and monomers. If acceleration of the oxygen scavenging process is desirable, the scavenging layer 35 may include both an organic material and an iron-based material.

Figure 3:
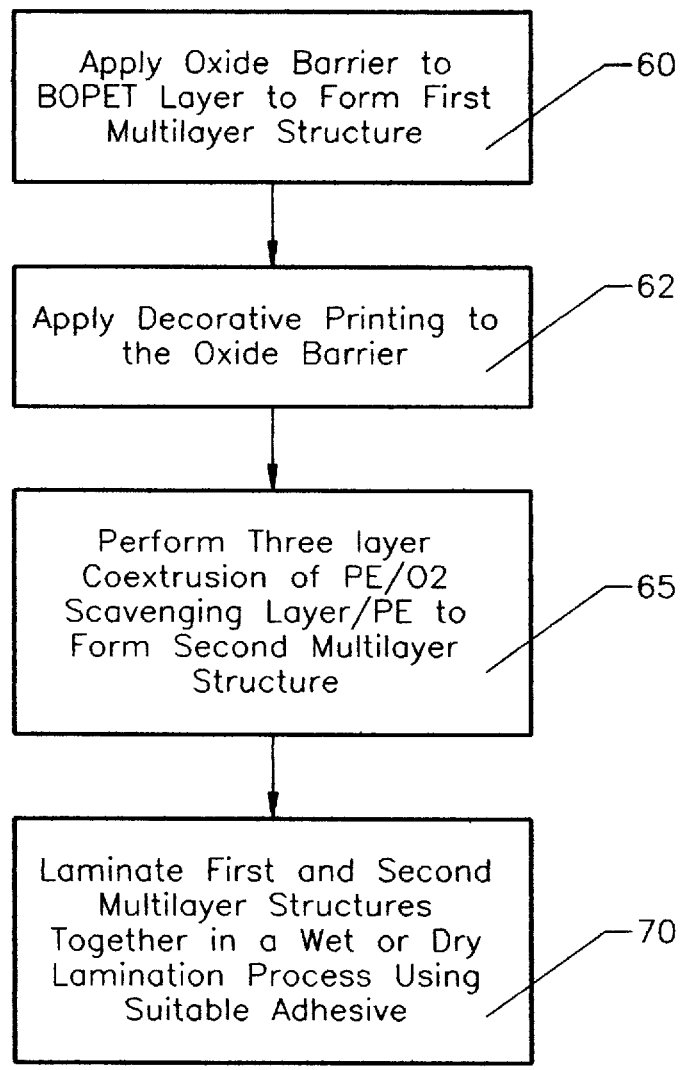
FIGS. 3 and 4 are flow diagrams illustrating embodiments of two preferred methods of manufacturing the laminate of FIG. 1.
Figure 4:
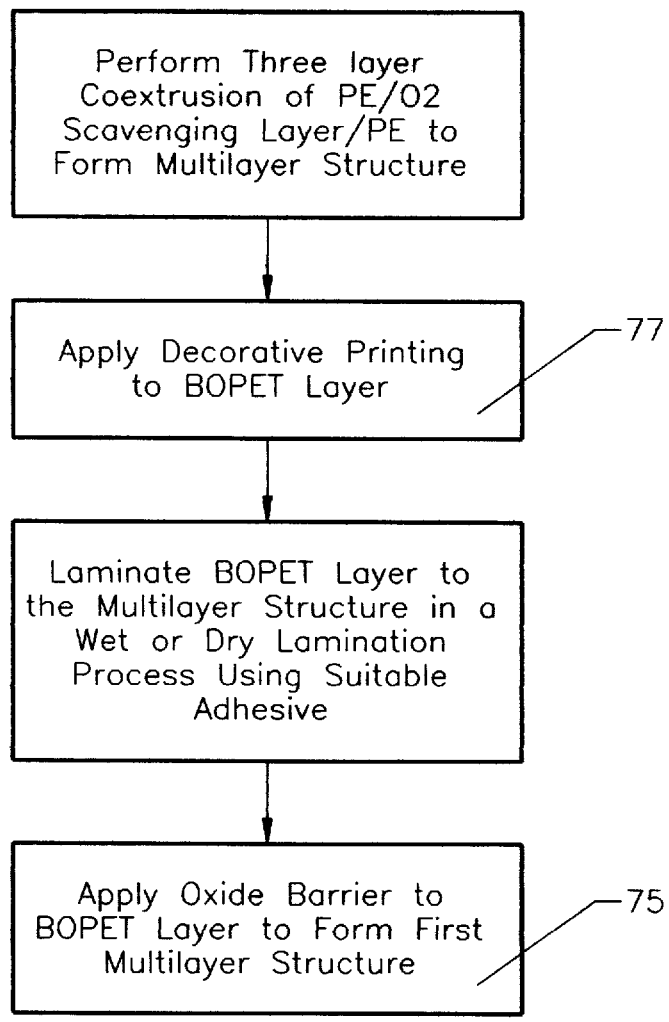

FIGS. 3 and 4 are flow diagrams illustrating embodiments of two methods of manufacturing the laminate of FIG. 1. As illustrated in FIG. 3, the first and second multilayer structures 10 and 25 may be constructed in separate processes. In one of these processes illustrated at step 60, the barrier oxide layer 15 is disposed on the surface of the BOPET layer 20 and an optional printing step 62 is performed to apply a decorative printing layer to the surface of the high barrier oxide layer 15 to thereby form the first multilayer structure 10. In a concurrent or time separated operation illustrated at step 65, the second multilayer structure 25 is formed by performing a three layer coextrusion of the outer PE layer 30, the oxygen scavenger layer 35, and the interior PE layer 40. The first and second multilayer structures 10 and 15 are then laminated together in a wet or dry lamination process illustrated at step 70. Execution of a wet lamination process is preferable In instances in which a temperature sensitive oxygen scavenging material is used in layer 35. Wet lamination processes can generally be carried out at a lower temperature than dry lamination processes and are thus more applicable to uses in which one or more laminate components contains a temperature sensitive material.

Various adhesives are suitable for joining the first and second multilayer structures 10 and 25. For example, a modified ethylene copolymer or a polyurethane adhesive may be used for this purpose. One polyurethane adhesive suitable for such use is sold under the name NC 253 A with co-reactant CA 3346 by Novacote International of Hamburg, Germany. One example of a modified ethylene copolymer is the anhydride functional LLDPE supplied by DuPont under the trade name of Bynel CXA.

FIG. 4 illustrates a further exemplary embodiment of a method for manufacturing the laminate when the high barrier layer 15 is disposed exterior to the layer of BOPET 20. As illustrated in this example, the oxide barrier 15 is applied at step 75 after the three layer coextrusion has been laminated to the layer of BOPET 20. Additionally, an optional printing step 77 may be used to apply a decoration to the BOPET layer prior to lamination to the second, coextruded multilayer structure. Such printing may also take place after the lamination process, but before the high barrier oxide is applied.

Figure 5:
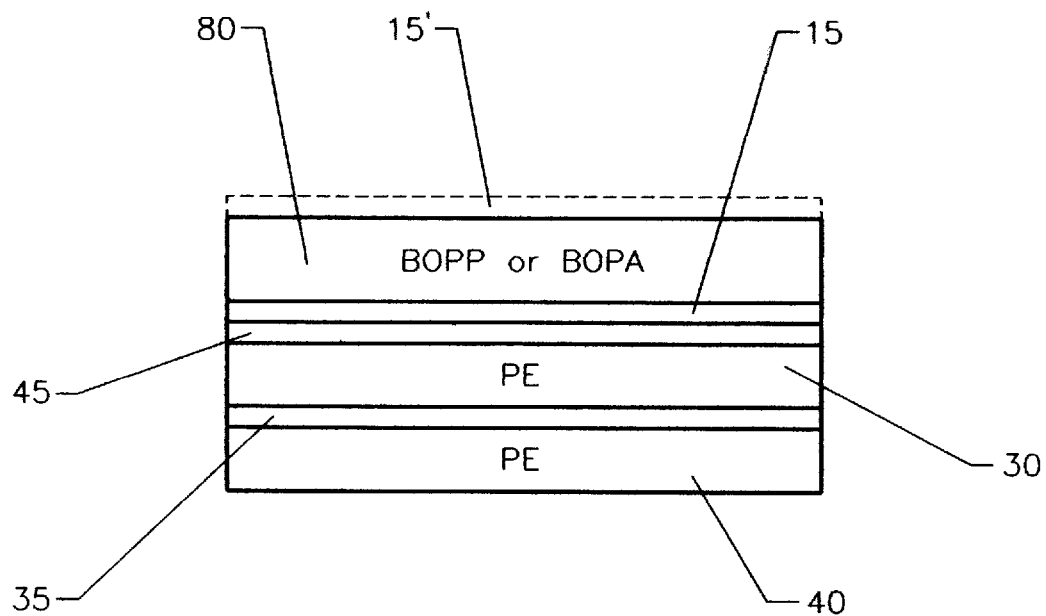
FIG. 5 is a cross-sectional view of a further embodiment of a laminate suitable for use in forming a package that contains an oxygen sensitive product.

FIG. 5 illustrates a further laminate, similar to the sequence of layers set forth in FIG. 1, except that a layer of biaxially oriented polypropylene or polyamide 80 is utilized in place of the layer of BOPET. The laminate can be manufactured in the manner illustrated in FIGS. 3 and 4, replacing the BOPET layer with the foregoing polypropylene or polyamide layer. The figure also illustrates the possibility of alternatively placing a high barrier oxide layer 15' exterior to the PP layer 80 as opposed to interior thereto.

Figure 6:
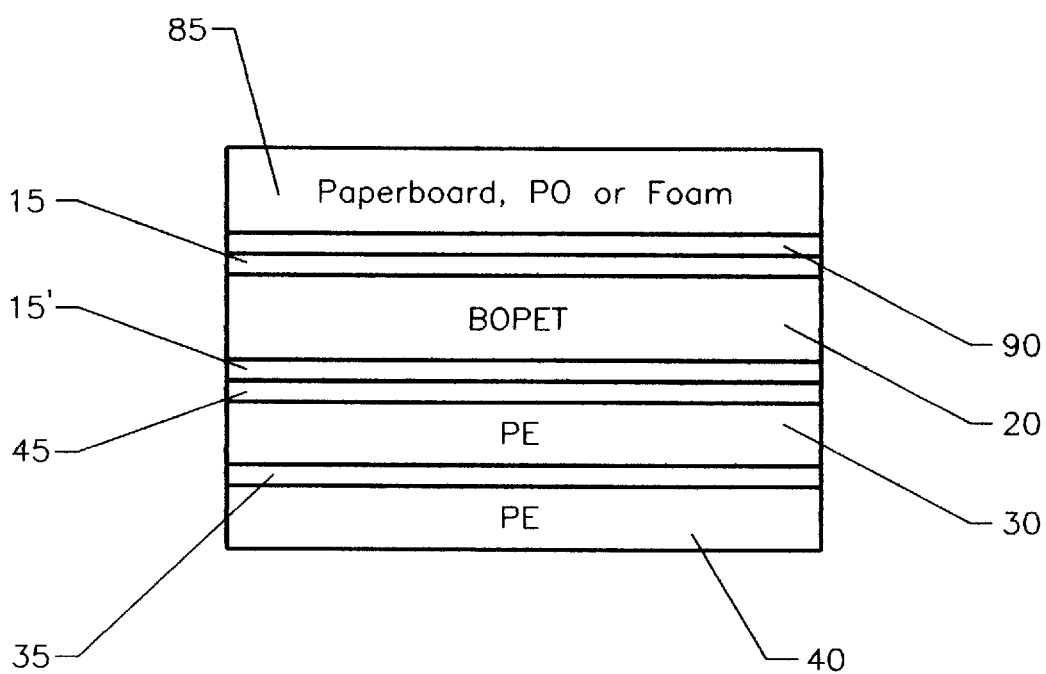
FIG. 6 illustrates application of further layers to the exterior layer of the laminate of FIG. 1.

The laminate structure illustrated in FIG. 1 may be further joined to one or more additional layers at the exterior face of the high barrier oxide layer 15. Such additional layers are illustrated at 85 in FIG. 6 and may comprise, for example, paperboard, polyolefin, and/or foam layers joined to the oxide barrier layer 15. Alternatively, the additional layers may be joined to the BOPET layer 20 where the oxide barrier layer, as illustrated at 15', is disposed interior to the layer 20. The illustrated layers are joined by a suitable adhesive layer 90 in a lamination process. Such layers may likewise be joined to the structure of FIG. 5.

Figure 7:
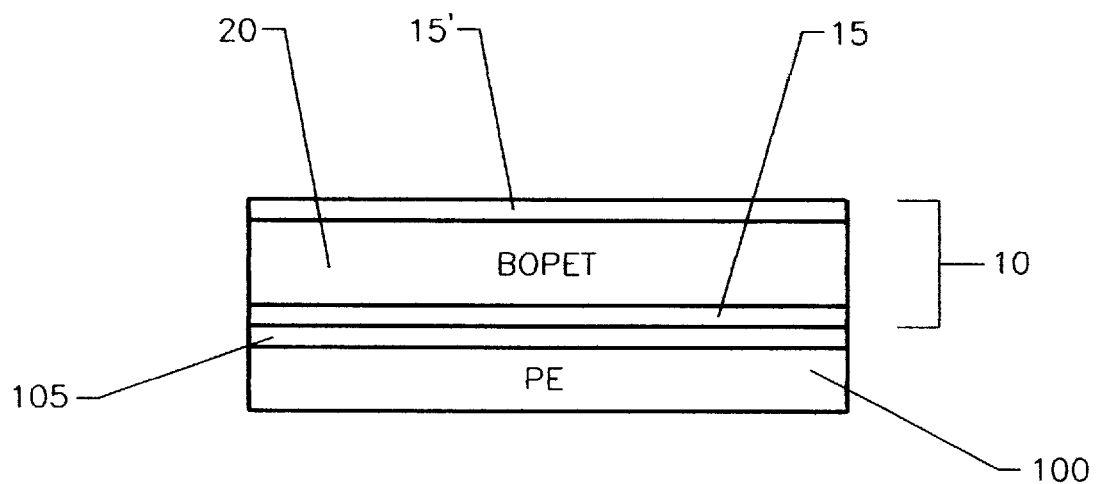
FIG. 7 is a cross-sectional view of a still further embodiment of a laminate suitable for use in forming a package that contains an oxygen sensitive product.

A further laminate structure suitable for packaging oxygen sensitive products is illustrated in FIG. 7. In the illustrated embodiment, a layer of high barrier oxide material 15 (or 15') is disposed on an interior (or exterior) surface of a layer of BOPET 20, or, alternatively, BOPP, or BOPA. The resulting dual layer structure 10 is then laminated, using a wet lamination process, to a layer of PE 100. The PE material may be any one of the previously discussed polyethylene materials. The dual layer structure 10 and the PE layer 100 are joined using a layer of adhesive 105 that includes very fine particulates of an oxygen scavenging material. The oxygen scavenging material can be any one or more of the materials noted above. The diameter of the oxygen scavenging particles is preferably less than 25 microns and, more preferably, less than 3 microns. This structure may also include additional layers, such as those discussed above in connection with FIG. 6.

Figure 8:
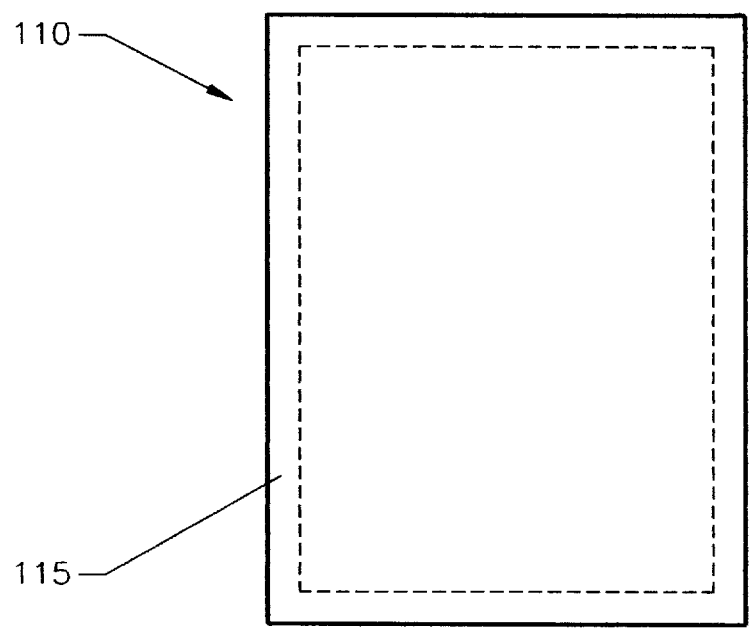
FIGS. 8–10 illustrate various pouches formed from one or more of the foregoing laminate materials.

Any of the foregoing laminate structures are suitable for use in forming a pouch, or the like. One example of a pillow-type pouch 110 is illustrated in FIG. 8. When used to form the pouch 110, the laminate is sealed in a back-to-back manner so that the interior layers of PE are joined to one another about at least a portion of a perimeter portion 115. The present pillow pouch may be used to replace traditional structures typically having a structure of PET/adhesive/Al foil/adhesive/LLDPE, since the new laminates are less costly and are easier to manufacture, yet provide a structurally sound pouch that is substantially impervious to oxygen.

Figure 9:
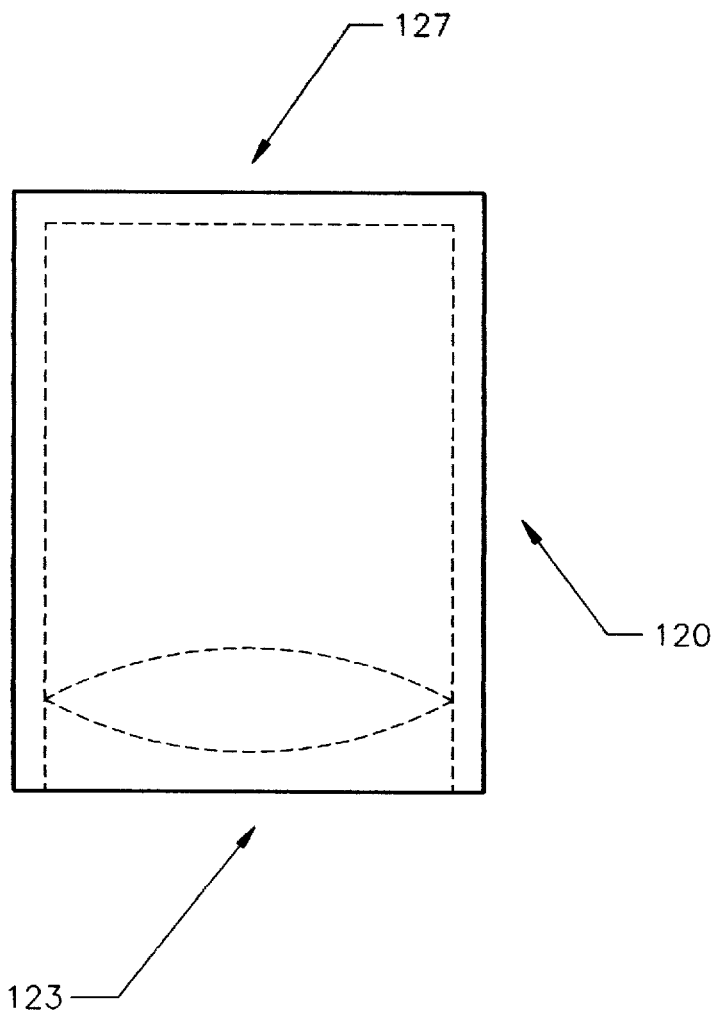
Figure 10:
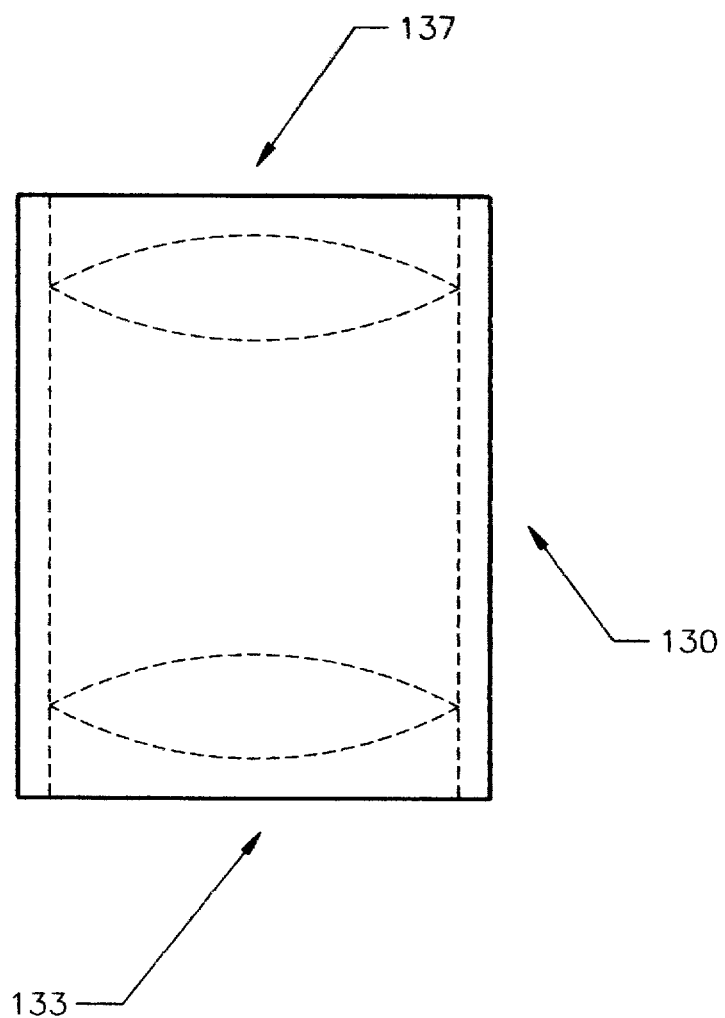

FIG. 9 illustrates a further pouch 120, commonly known as the "Doy-Pak" type pouch. Such a pouch can be manufactured in accordance with the teachings of expired U.S. Pat. No. 3,502,521 and includes a gusseted bottom structure 123 and a flattened top portion 127. FIG. 10 illustrates a pouch 130 including both a gusseted bottom section 133 and a gusseted top section 137. Such pouch structures have a variety of uses.

Although the present invention has been described with reference to a specific embodiment, those of skill in the art will recognize that changes may be made thereto without departing from the scope and spirit of the invention as set forth in the appended claims.

I claim as my invention:

1. A laminate material comprising:
    a first layer of biaxially oriented polyethylene terephthalate;
    a second layer of a high barrier oxide material disposed interior to the first layer;
    a third layer of an adhesive material disposed interior to the second layer;
    a fourth coextruded multilayer material comprising from exterior to interior,
        a first layer of a polyethylene material,
        an oxygen scavenging layer comprising a polyethylene and an oxygen scavenger material, the oxygen scavenging layer being disposed interior to the first layer of the polyethylene material,
        a second layer of a polyethylene material disposed interior to the oxygen scavenging layer;
    the second and fourth layers being laminated together by the third layer of adhesive material.

2. A laminate material as claimed in claim 1 wherein the polyethylene material is linear low density polyethylene.

3. A laminate material as claimed in claim 1 wherein the polyethylene material is very low density polyethylene.

4. A laminate material as claimed in claim 1 wherein the polyethylene material is a metallocene polyethylene.

5. A laminate material as claimed in claim 1 wherein the high barrier oxide material is an oxide selected from the group consisting of a silicon oxide, an aluminum oxide, and a titanium oxide.

6. A laminate material as claimed in claim 5 wherein the polyethylene material is selected from the group consisting of linear low density polyethylene, very low density polyethylene, and a metallocene polyethylene.

7. A laminate material as claimed in claim 1 and further comprising a decorative printing on the second layer of high barrier oxide material.

8. A laminate material as claimed in claim 1 and further comprising a decorative printing on a surface of the first layer of biaxially oriented polyethylene terephthalate layer adjacent the second layer of high barrier oxide material.

9. A laminate material comprising:
    a first multilayer material comprising
        a layer of biaxially oriented polyethylene terephthalate;
        a layer of a high barrier oxide material coated on a surface of the layer of biaxially oriented polyethylene terephthalate;
    a second multilayer material comprising a coextrusion of
        a first layer of a polyethylene material,
        an oxygen scavenging layer comprising a polyethylene and an oxygen scavenger material, the oxygen scavenging layer being adjacent the first layer of the polyethylene material,
        a second layer of a polyethylene material adjacent the oxygen scavenging layer;
    the first and second multilayer materials being laminated to one another by a third layer of adhesive material disposed between the first multilayer material and the first layer of the polyethylene material.

10. A laminate material as claimed in claim 9 wherein the third layer of adhesive material joins the first layer of polyethylene material with the layer of high barrier oxide material.

11. A laminate material as claimed in claim 10 and further comprising a decorative printing on the layer of high barrier oxide.

12. A laminate material as claimed in claim 10 and further comprising a decorative printing on the layer of biaxially oriented polyethylene terephthalate.

13. A laminate material as claimed in claim 9 wherein the polyethylene material is linear low density polyethylene.

14. A laminate material as claimed in claim 9 wherein the polyethylene material is very low density polyethylene.

15. A laminate material as claimed in claim 9 wherein the polyethylene material is a metallocene polyethylene.

16. A laminate material as claimed in claim 9 wherein the high barrier oxide material is an oxide selected from the group consisting of a silicon oxide, an aluminum oxide, and a titanium oxide.

17. A laminate material as claimed in claim 16 wherein the polyethylene material is selected from the group consisting of linear low density polyethylene, very low density polyethylene, and a metallocene polyolefin.

18. A laminate material comprising:
    a) a first layer of biaxially oriented polyethylene terephthalate;
    b) a second layer of a high barrier oxide material disposed interior to the first layer;
    c) a third layer of an adhesive material disposed interior to the second layer, the third layer of adhesive material including an oxygen scavenger material;
    d) a fourth layer of a polyethylene material disposed interior to the third layer;
    e) the second and fourth layers being laminated together by the third layer of adhesive material.

19. A laminate material as claimed in claim 18 and further comprising a decorative printing on a layer of the laminate selected from the group of layers consisting of the second layer of high barrier oxide material and the first layer of biaxially oriented polyethylene terephthalate.

20. A laminate material as claimed in claim 18 wherein the polyethylene material is linear low density polyethylene.

21. A laminate material as claimed in claim 18 wherein the polyethylene material is very low density polyethylene.

22. A laminate material as claimed in claim 18 wherein the polyethylene material is a metallocene polyethylene.

23. A laminate material as claimed in claim 18 wherein the high barrier oxide material is an oxide selected from the group consisting of a silicon oxide, an aluminum oxide, and a titanium oxide.

24. A laminate material as claimed in claim 23 wherein the polyethylene material is selected from the group consisting of linear low density polyethylene, very low density polyethylene, and a metallocene.

25. A laminate material comprising:
    a) a multilayer structure comprising
        i. a layer of biaxially oriented polyethylene terephthalate,
        ii. a layer of a high barrier oxide material coated on a surface of the first layer;
    b) a further layer structure comprising a layer of a polyethylene material disposed interior to the multilayer structure,
    c) the multilayer structure and further layer structure being laminated to one another by an adhesive layer that incorporates an oxygen scavenging material therein.

26. A laminate material as claimed in claim 25 wherein the polyethylene material is linear low density polyethylene.

27. A laminate material as claimed in claim 25 wherein the polyethylene material is very low density polyethylene.

28. A laminate material as claimed in claim 25 wherein the polyethylene material is a metallocene polyethylene.

29. A laminate material as claimed in claim 25 wherein the high barrier oxide material is an oxide selected from the group consisting of a silicon oxide, an aluminum oxide, and a titanium oxide.

30. A laminate material as claimed in claim 29 wherein the polyethylene material is selected from the group consisting of linear low density polyethylene, very low density polyethylene, and a metallocene.

31. A pouch structure comprising:
    a first layer of biaxially oriented polyethylene terephthalate;
    a second layer of a high barrier oxide material disposed interior to the first layer;
    a third layer of an adhesive material disposed interior to the second layer;
    a fourth coextruded multilayer material comprising from exterior to interior,
        a first layer of a polyethylene material,
        an oxygen scavenging layer comprising a polyethylene and an oxygen scavenger material, the oxygen scavenging layer being disposed interior to the first layer of the polyethylene material,
        a second layer of a polyethylene material disposed interior to the oxygen scavenging layer;
    the second and fourth layers being laminated together by the third layer of adhesive material.

32. A pouch structure as claimed in claim 31 and further comprising a decorative printing on a layer of the pouch structure selected from the group consisting of the first layer of biaxially oriented polyethylene terephthalate and the second layer of high barrier oxide material.

33. A pouch structure as claimed in claim 31 wherein the polyethylene material is linear low density polyethylene.

34. A pouch structure as claimed in claim 31 wherein the polyethylene material is very low density polyethylene.

35. A pouch structure as claimed in claim 35 wherein the polyethylene material is a metallocene polyethylene.

36. A pouch structure as claimed in claim 31 wherein the high barrier oxide material is an oxide selected from the group consisting of a silicon oxide, an aluminum oxide, and a titanium oxide.

37. A pouch structure as claimed in claim 36 wherein the polyethylene material is selected from the group consisting of linear low density polyethylene, very low density polyethylene, and a metallocene.

38. A pouch structure comprising:
    a first multilayer material comprising
        a layer of biaxially oriented polyethylene terephthalate;
        a layer of a high barrier oxide material coated on a surface of the layer of biaxially oriented polyethylene terephthalate;
    a second multilayer material comprising a coextrusion of
        a first layer of a polyethylene material,
        an oxygen scavenging layer comprising a polyethylene and an oxygen scavenger material, the oxygen scavenging layer being adjacent the first layer of the polyethylene material,
        a second layer of a polyethylene material adjacent the oxygen scavenging layer;
    the first and second multilayer materials being laminated to one another by a third layer of an adhesive material;
    the pouch being formed by sealing the second layer of the polyethylene material in a back-to-back manner.

39. A pouch structure as claimed in claim 38 and further comprising a decorative printing on a layer of the pouch structure selected from the group consisting of the layer of biaxially oriented polyethylene terephthalate and the layer of high barrier oxide material.

40. A pouch structure as claimed in claim 38 wherein the polyethylene material is linear low density polyethylene.

41. A pouch structure as claimed in claim 38 wherein the polyethylene material is very low density polyethylene.

42. A pouch structure as claimed in claim 38 wherein the polyethylene material is a metallocene polyethylene.

43. A pouch structure as claimed in claim 38 wherein the high barrier oxide material is an oxide selected from the group consisting of a silicon oxide, an aluminum oxide, and a titanium oxide.

44. A pouch structure as claimed in claim 43 wherein the polyethylene material is selected from the group consisting of linear low density polyethylene, very low density polyethylene, and a metallocene.

45. A pouch structure comprising:
   a) a first layer of biaxially oriented polyethylene terephthalate;
   b) a second layer of a high barrier oxide material disposed interior to the first layer;
   c) a third layer of an adhesive material disposed interior to the second layer, the third layer of adhesive material including an oxygen scavenger material;
   d) a fourth layer of a polyethylene material disposed interior to the third layer;
   e) the first and fourth layers being laminated together by the third layer of adhesive material;
   f) the pouch being formed by sealing the fourth layer of the polyethylene material in a back-to-back manner.

46. A pouch structure as claimed in claim 45 and further comprising a decorative printing on a layer of the pouch selected from the group consisting of the first layer of biaxially oriented polyethylene terephthalate and the second layer of high barrier oxide material.

47. A pouch structure as claimed in claim 45 wherein the polyethylene material is linear low density polyethylene.

48. A pouch structure as claimed in claim 45 wherein the polyethylene material is very low density polyethylene.

49. A pouch structure as claimed in claim 45 wherein the polyethylene material is a metallocene polyethylene.

50. A pouch structure as claimed in claim 45 wherein the high barrier oxide material is an oxide selected from the group consisting of a silicon oxide, an aluminum oxide, and a titanium oxide.

51. A pouch structure as claimed in claim 49 wherein the polyethylene material is selected from the group consisting of linear low density polyethylene, very low density polyethylene, and a metallocene.

52. A pouch structure comprising:
   a) a multilayer structure comprising
      i. a layer of biaxially oriented polyethylene terephthalate,
      ii. a layer of a high barrier oxide material coated on a surface of the first layer;
   b) a further layer structure comprising a layer of a polyethylene material disposed interior to the multilayer structure,
   c) the multilayer structure and further layer structure being laminated to one another by an adhesive layer that incorporates an oxygen scavenging material therein;
   d) the pouch being formed by sealing the layer of polyethylene material in a back-to-back manner.

53. A pouch structure as claimed in claim 52 and further comprising a decorative printing on a layer of the pouch selected from the group consisting of the first layer of biaxially oriented polyethylene terephthalate and the second layer of high barrier oxide material.

54. A pouch structure as claimed in claim 52 wherein the polyethylene material is linear low density polyethylene.

55. A pouch structure as claimed in claim 52 wherein the polyethylene material is very low density polyethylene.

56. A pouch structure as claimed in claim 52 wherein the polyethylene material is a metallocene polyethylene.

57. A pouch structure as claimed in claim 52 wherein the high barrier oxide material is an oxide selected from the group consisting of a silicon oxide, an aluminum oxide, and a titanium oxide.

58. A pouch structure as claimed in claim 57 wherein the polyethylene material is selected from the group consisting of linear low density polyethylene, very low density polyethylene, and a metallocene.

59. A laminate material comprising:
   a) a first layer of a material selected from the group consisting of biaxially oriented polypropylene, biaxially oriented polyamide, and biaxially oriented polyethylene terephthalate;
   b) a second layer of a high barrier oxide material disposed interior to the first layer;
   c) a third layer of an adhesive material disposed interior to the second layer;
   d) a fourth coextruded multilayer material comprising from exterior to interior,
      i. a first layer of a polyethylene material,
      ii. an oxygen scavenging layer comprising a polyethylene and an oxygen scavenger material, the oxygen scavenging layer being disposed interior to the first layer of the polyethylene material,
      iii. a second layer of the polyethylene material disposed interior to the oxygen scavenging layer,
   e) the second and fourth layers being laminated together by the third layer of adhesive material.

60. A laminate material as claimed in claim 59 and further comprising a decorative printing on a layer of the laminate selected from the group consisting of the first layer of material and the second layer of high barrier oxide material.

61. A laminate material comprising:
   a first multilayer material comprising
      a layer of material selected from the group of materials consisting of biaxially oriented polypropylene, biaxially oriented polyamide, and biaxially oriented polyethylene terephthalate;
      a layer of a high barrier oxide material coated on a surface of;
   a second multilayer material comprising a coextrusion of
      a first layer of a polyethylene material,
      an oxygen scavenging layer comprising a polyethylene and an oxygen scavenger material, the oxygen scavenging layer being adjacent the first layer of the polyethylene material,
      a second layer of a polyethylene material adjacent the oxygen scavenging layer;
   the first and second multilayer materials being laminated to one another by a third layer of an adhesive material.

62. A laminate material as claimed in claim 61 wherein the first multilayer material further comprises a decorative printing.

63. A laminate material comprising:
   a) a first layer of a material selected from the group of materials consisting of biaxially oriented polypropylene, biaxially oriented polyamide, and biaxially oriented polyethylene terephthalate;

b) a second layer of a high barrier oxide material disposed interior to the first layer;

c) a third layer of an adhesive material disposed interior to the second layer, the third layer of adhesive material including an oxygen scavenger material;

d) a fourth layer of a polyethylene material disposed interior to the third layer;

e) the second and fourth layers being laminated together by the third layer of adhesive material.

64. A laminate material as claimed in claim 63 and further comprising a decorative printing on a layer of the laminate selected from the group consisting of the first layer of material and the second layer of high barrier oxide material.

65. A laminate material comprising:

a) a multilayer structure comprising i. a layer of a material selected from the group of materials consisting essentially of biaxially oriented polypropylene, biaxially oriented polyamide, and biaxially oriented polyethylene terephthalate, ii. a layer of a high barrier oxide material coated on a surface of the first layer;

b) a further layer structure comprising a layer of a polyethylene material disposed interior to the multilayer structure, c) the multilayer structure and further layer structure being laminated to one another by an adhesive layer that incorporates an oxygen scavenging material therein.

66. A laminate material as claimed in claim 65 wherein the multilayer structure further comprises a decorative printing.

\* \* \* \* \*